Aug. 6, 1968   E. C. TROY   3,395,834
AUTOMATICALLY CONTROLLED MIXER DISCHARGE SYSTEM
Filed May 4, 1966   3 Sheets-Sheet 1

INVENTOR:
ELBERT C. TROY
BY
Mason, Kolehmainen, Rathburn & Wyss
ATT'YS

Aug. 6, 1968     E. C. TROY     3,395,834

AUTOMATICALLY CONTROLLED MIXER DISCHARGE SYSTEM

Filed May 4, 1966     3 Sheets-Sheet 2

INVENTOR:
ELBERT C. TROY
BY
Mason, Kolehmainen, Rathburn & Wyss
ATT'YS

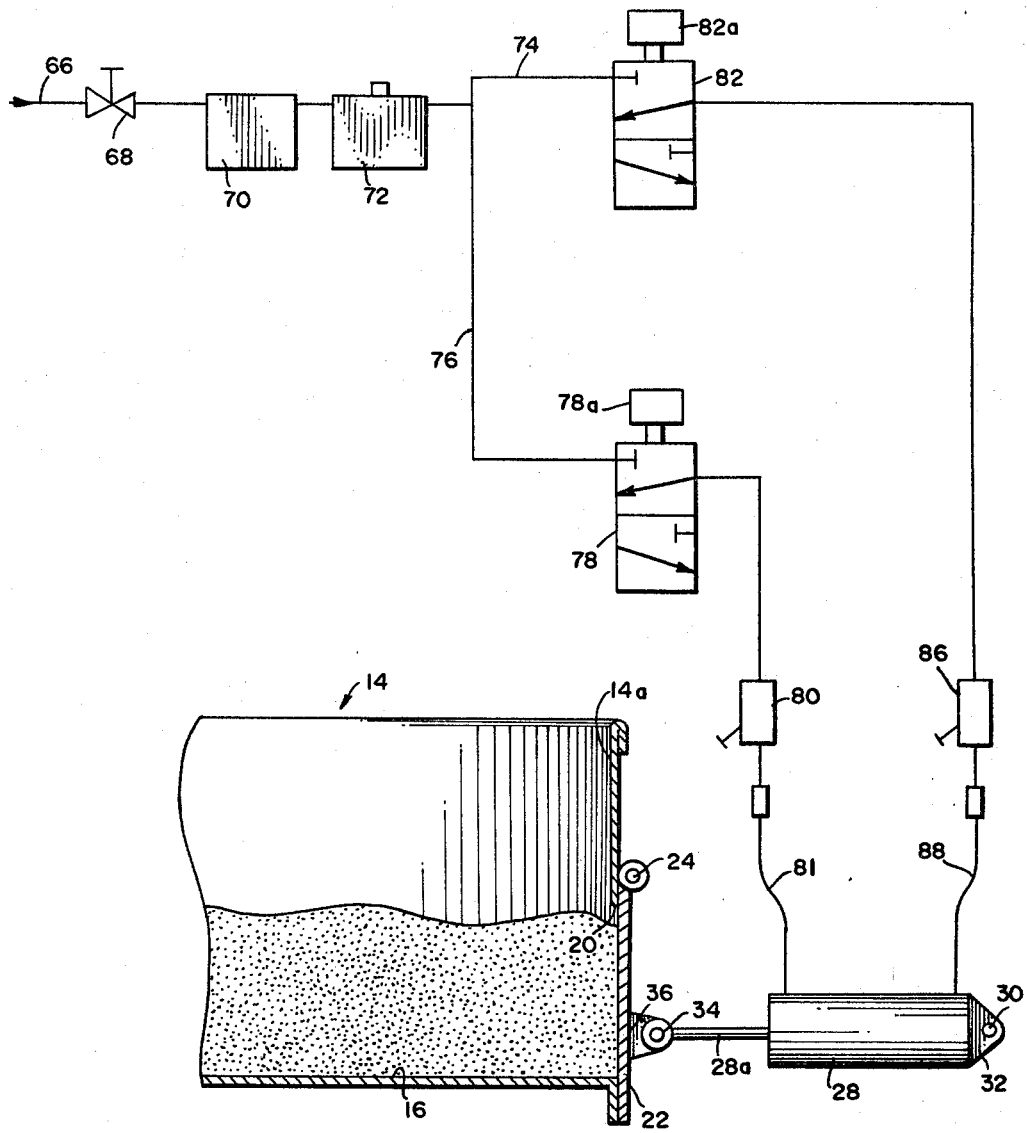

United States Patent Office 3,395,834
Patented Aug. 6, 1968

3,395,834
AUTOMATICALLY CONTROLLED MIXER
DISCHARGE SYSTEM
Elbert C. Troy, Highland Park, Ill., assignor to National Engineering Company, Chicago, Ill., a corporation of Delaware
Filed May 4, 1966, Ser. No. 547,610
6 Claims. (Cl. 222—63)

The present invention relates to a new and improved automatically controlled mixer discharge system and is an improvement on the controlled rate discharge device shown and described in U.S. Patent No. 3,231,146, dated Jan. 25, 1966.

In mixers and mulling machines for conditioning particulate materials, such as foundry sand, powdered materials and the like, it is highly desirable to provide a discharge system which is responsive to the condition of the material that is being treated. Moreover, in machines utilized in a continuous flow system, as distinguished from a batch system, it is useful to provide means for discharging the material at a variable rate to automatically compensate for flow variations in the system which otherwise might overload the mixing machine and cause damage thereby. On the other hand, when the flow rate of material into the mixing machine decreases considerably, it is desirable to reduce the discharge rate or completely stop the discharge so that material will be retained in the machine for thorough mixing until the system flow rate increases again into a normal operating range. In systems wherein a mixing machine is used in a batch-type operation and materials are added to the machines in batches rather than on a continuous basis, it is desirable to provide an automatic discharge device which will discharge material from the machine at a controlled high rate during the periods when material is being added to the mixer.

Accordingly, it is an object of the present invention to provide a new and improved automatically controlled discharge system which accomplishes the foregoing desirable characteristics.

More specifically, it is an object of the present invention to provide a new and improved automatically controlled mixer discharge system which is responsive to the condition of the material being treated.

Another object of the invention is the provision of a new and improved automatically controlled discharge device in which the discharge rate responds instantaneously to the quantity of material in the mixer.

Yet another object of the present invention is the provision of a new and improved mixer employing an automatically controlled discharge device operable to maintain an optimum quantity of material in the mixer.

Still another object of the invention is the provision of a new and improved controlled rate discharge device for mixers and the like, including a discharge door or gate movable toward a closing position in response to a selected low level of material in the mixer and movable toward an open position in response to a selected high level of material.

Yet another object of the invention is the provision of a new and improved apparatus as described in the foregoing object wherein the discharge gate or door is in a free or floating condition when the material in the mixer is between a selected high and low level.

Still another object of the invention is the provision of a new and improved automatically controlled discharge device for a mixer and the like which is responsive to maintain the level of material in the mixer at a selected optimum value.

The foregoing and other objects and advantages of the present invention are accomplished by the provision of a new and improved automatically controlled discharge device for a mixer and the like, including a mixing chamber having a power driven mixing head therein for mixing and agitating material in the chamber. The mixing chamber is formed with a discharge opening and a discharge door or gate is mounted to move with respect to the opening to control the discharge of material from the chamber. Operator means, such as a fluid cylinder, is provided to move the gate or door between a closed and an open position and metering control means are provided to actuate the operator means in response to the condition of the material in the mixing chamber. Specifically, the metering control means senses the load or power supplied to the mixing head, and when the load reaches a selectively adjustable low level, the operator means is actuated to move the door toward a closed position. When the load reaches a selected high level, the operator means is actuated to move the door or gate toward an open position to increase the discharge rate, and when the load is an intermediate value between the selected upper and lower levels, the operator means permits the door to freely float in an intermediate range directly responsive to the pressure of material in the chamber against the discharge door.

For a better understanding of the invention, reference should be had to the following detailed description taken in conjunction with the drawings, in which:

FIG. 4 is a schematic illustrtaion of one embodiment of a pneumatic control system of the present invention.

Figure 1:
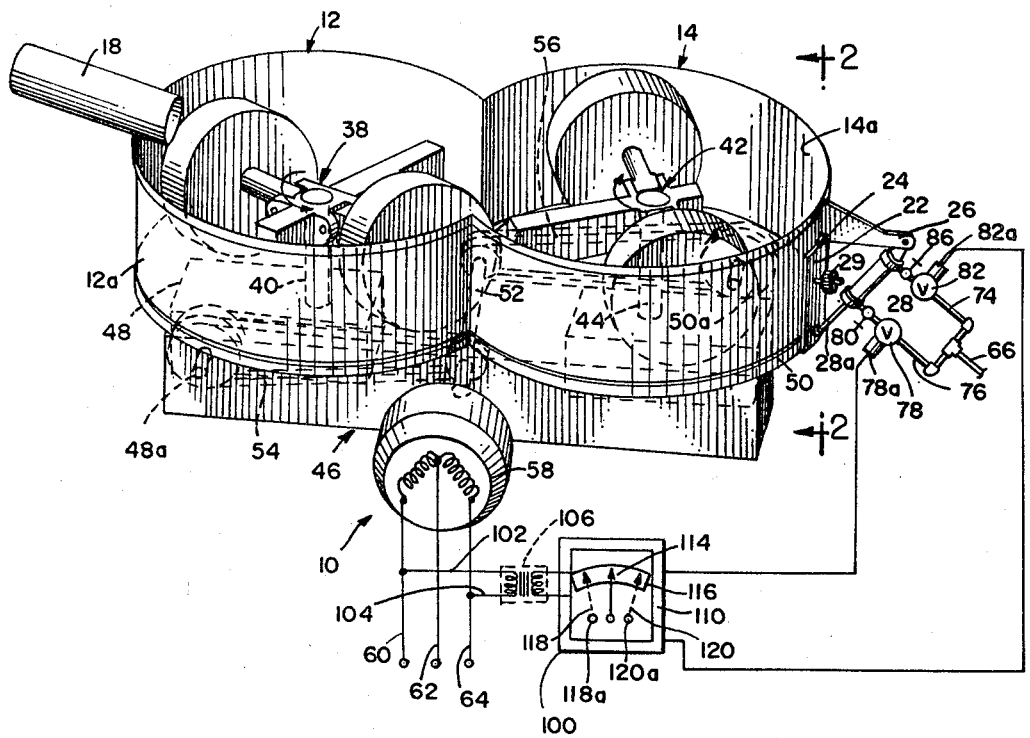
FIG. 1 is a perspective and schematic view of a new and improved mixer with an automatically controlled rate discharge system constructed in accordance with the features of the present invention.

Referring now more specifically to the drawings, in FIG. 1 is illustrated a continuous mixing and mulling machine in accordance with the present invention and indicated generally by the reference numeral 10. The mixer 10 includes a pair of interconnected mixing chambers 12 and 14 having a common floor or bottom wall 16 and upstanding vertical sidewalls 12a and 14a which are joined together at a pinched or narrowed central portion of the mixer, permitting the material being treated to move between the two chambers. Material to be conditioned is delivered to the chamber 12, which constitutes an input stage through a delivery chute 18 or other suitable feeding mechanism, such as belt conveyors or the like, and is mixed and conditioned in the chamber before passing into the second chamber 14 for a final stage of conditioning before discharge. The sidewall 14a of the output chamber 14 is formed with a discharge opening 20 to permit the outflow or discharge of the finished material. In order to control the discharge of material through the outlet opening 20, a discharge door or gate 22 is mounted for pivotal movement between a closed position (FIG. 4) and an open position (FIG. 2) on a mounting pin 24. The pin 24 is supported by suitable bracket means 26 projecting outwardly from the sidewall 14a and the bracket means provides support for one end of a door operating fluid cylidner 28 which is connected to the bracket by a pin 30 and clevis 32 on the fixed end of the cylinder. At the opposite end of the cylinder 28, or rod end, the movable piston rod 28a is connected to the lower portion of the gate 22 by a crosspin 34 on the cylinder rod and a clevis 36 mounted on the outside surface of the gate. Accordingly, when pressurized fluid is supplied to the upper end of the cylinder adjacent the bracket 26, the gate 22 is moved toward a closed position, and when fluid is supplied to the opposite or rod end of the cylinder, the gate is moved toward an open position. Moreover, when both ends of the cylinder 28 are open to the atmosphere, the discharge gate 22 is in an intermediate or floating condition and is free to move toward or away from the discharge opening 20 in response to the pressure of the material in the mixer against the gate. An adjustable weight or counterbalance 29 is mounted on a threaded rod extending outwardly from the gate 22, and the weight can be moved to provide for the desired pressure responsive characteristics of the gate when in an intermediate floating condition.

The mixer 10 is of the general type illustrated and described in U.S. Patent No. Re. 25,475, dated Nov. 5, 1963, and can be used in a continuous flow or batch-type system. Preferably, however, the mixer is used in a continuous flow system and it is contemplated that the new material will be supplied in a somewhat continuous manner to the chamber 12 through the inlet chute 18. The chamber 12 contains a rotary mixing head assembly 38 which includes a centrally located, upstanding drive shaft or axle 40. The drive shaft 40 projects downwardly through an opening in the bottom wall 16 for driving connection underneath the mixing chamber 12 with a power system to be described hereinafter. A similar mixing head 42 is mounted in the chamber 14 and this mixing head likewise includes a centrally located, upstanding drive shaft or axle 44 which projects through the bottom wall for driving connection with the power system. The mixing heads 38 and 42 are driven to rotate in opposite directions, as indicated by the arrows, and each includes a pair of mulling wheels and an inner and outer plow or scraper (not shown) for pulverizing and mixing the material contained in the mixing chambers. As described in the aforementioned U.S. patent, the outer plows of the mixing heads traverse a common path or area adjacent the junction of the sidewalls 12a and 14a of the mixing chambers and, accordingly, material is transferred back and forth between the mixing chambers as the mixing heads rotate. Generally, the material entering the mixing chamber 12 is mixed and pulverized by the mixing head 38 and is then transferred into the chamber 14 where further mixing and pulverization is accomplished by the mixing head 42 before the finished material is ultimately discharged through the opening 20. To this end, the mixing heads are driven in selected synchronous relation to one another, and this insures that the outer plow of one head does not interfere with the outer plow or mulling wheels of the other when traversing the common area adjacent the junction of the mixing chambers 12 and 14. It is also to be understood that the mixing heads employed can be somewhat different from those illustrated in the aforementioned U.S. patent; for example, when mixing dry materials, it is sometimes desirable to eliminate the mulling wheels altogether and substitute plows or scrapers in their stead to be driven by the mixing heads at much higher speeds than when mulling wheels are present. One such high speed mixing head arrangement is shown and described in the copending U.S. patent application filed Jan. 5, 1966, Ser. No. 235,850 and it is contemplated that the discharge system of the present invention may be effectively utilized on a machine of this type.

In order to drive the shafts 40 and 44 of the respective mixing head assemblies 38 and 42, a power driving system indicated generally as 46 is mounted below the mixing chamber floor or bottom wall 16. The power driving system 46 includes a pair of speed reducers 48 and 50 which are secured to the underside of the bottom wall 16 and are directly connected to the mixing head drive shafts 40 and 44, respectively. The speed reducers 48 and 50 includes respective input shafts 48a and 50a, and these input shafts are driven from a common power shaft 52 by a pair of belt drive assemblies 54 and 56. The common drive shaft 52 is directly coupled to an electric motor 58, preferably of the three-phase, alternating current type. The windings of the motor are supplied with alternating current from a three-wire A.C. supply system indicated by the wires 60, 62 and 64, and when a three-phase A.C. power is connected to the lines 60, 62 and 64, the motor 58 is energized and begins to rotate, thereby turning the mixing head assemblies 38 and 42 in selected synchronous rotation. The amount of electrical energy or power supplied through the lines 60, 62, and 64 is directly proportional to the amount and/or viscosity of the material contained in the mixing chambers 12 and 14. If a greater than average amount of material is in the mixing chambers or the material is more viscous than average, more electrical energy will be required to turn the mixing head assemblies 38 and 42 and, correspondingly, a reduction of the material in the chambers or a reduction in the viscosity thereof will reduce the electrical energy supplied to the driving motor 58.

In accordance with the present invention, the discharge door or gate 22 is automatically controlled in response to the amount of power supplied to the motor 58 so that an optimum quantity of material is maintained in the mixing chambers 12 and 14 during the continuous mixing process. Accordingly, an electropneumatic control system is interconnected between the power lines 60, 62 and 64 supplying current to the motor 58 and the operator cylinder 28 to control the movement of the discharge gate 22, thereby automatically regulating the discharge rate of material through the discharge opening 20.

The electropneumatic control system is indicated schematically in FIGS. 3 and 4 and will be described in greater detail hereinafter. The pneumatic portion of the control system is shown in FIG. 4 and includes a fluid supply line 66 adapted to be connected to a source of compressed air. The supply line 66 is connected through a shut-off valve 68, filter 70, and lubricator 72 to a pair of branch lines 74 and 76 which are interconnected with opposite ends of the fluid cylinder 28. The branch line 76 is connected to the rod end of the cylinder 28 through a two-way solenoid valve 78, an adjustable speed control valve 80 and a flexible line 81 to accommodate movement of the cylinder.

The branch line 74 is connected to the other end of the cylinder 28 through a solenoid control valve 82, an adjustable speed control valve 86, and a flexible line 88. Preferably, the solenoid control valves 78 and 82 are identical, and each includes a solenoid winding, 78a and 82a, respectively. The valves are illustrated in a de-energized or exhaust position whereby the opposite ends of the fluid cylinder 28 are exhausted to the atmosphere through exhaust ports of the respective valves. Accordingly, when a signal of electrical energy is not being supplied to either of the valve windings 78a or 82a, the discharge gate or door 22 is in a free floating position, as previously described, and can move toward or away from the opening 20 in the mixing chamber sidewall in response to the pressure or height of material in the mixer. When the material height is above average, the door 22 will tend to open more and increase the discharge rate to reduce the material level, and when the level is below average, the door will tend to move toward a closed position, thereby reducing the material level back to a selected average level. The counterweight 29 can be adjusted to provide the desired average level for any type of material being handled.

Figure 2:
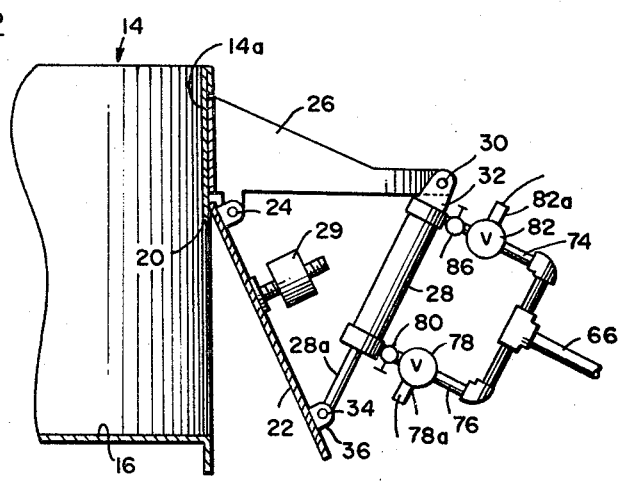
FIG. 2 is a fragmentary sectional view taken substantially along line 2—2 of FIG. 1, illustrating the discharge gate in an open condition.

When the level of material in the mixer reaches a selected maximum level, the solenoid 78a is energized, and the valve 78 is thereby moved toward an operative position wherein compressed fluid from the branch line 76 is directed through the speed control valve 80 and flexible line 81 into the rod end of the cylinder 28. When this occurs, the discharge gate or door 22 is moved toward a fully open position, as illustrated in FIG. 2, and the discharge rate increases rapidly to reduce the level of material in the mixer. Upon de-energizing the solenoid 78a, the valve 78 returns to its normal position and the rod end of the cylinder 28 is again connected with the atmosphere, and the discharge gate 22 then returns to its floating intermediate operating range or condition. The speed control valve 80 is adjustable to meter or throttle the fluid flow into the cylinder and, accordingly, the speed of opening of the door when the solenoid valve 78 is energized can be adjusted as desired. When the level of material in the mixer is below a selected minimum, the solenoid winding 82a is energized and the valve 82 is thereby moved to an operative position wherein the branch line 74 is connected through the valve into the speed control valve 86 and flexible line 88 to the other end of the cylinder 28. This causes a discharge gate or door 22 to move rapidly toward a closed position, as illustrated in FIGS. 1 and 4, shutting off, or greatly reducing, the discharge of material from the mixing chamber 14. As soon as the level of material builds up to above the selected minimum level, the solenoid 82a is again de-energized and the cylinder 28 is returned to a free floating condition, because the fluid from both ends of the cylinder is connected to exhaust through the valves 78 and 82.

Figure 3:
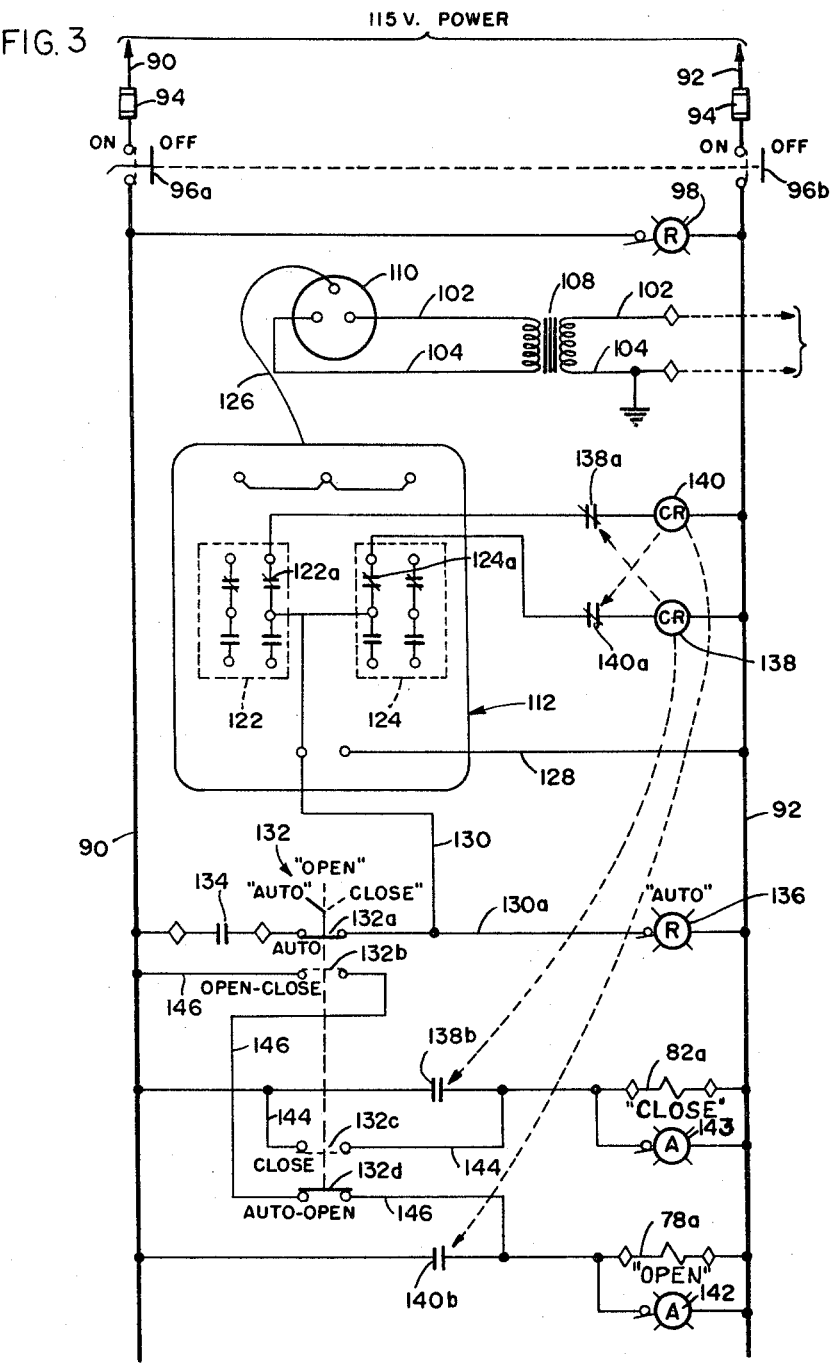
FIG. 3 is a schematic diagram of one embodiment of an electrical control circuit of the present invention.

The electrical portion of the electropneumatic control system is schematically illustrated in FIG. 3 and provides means for selectively energizing the respective solenoid winding 78a and 82a in response to the condition of material in the mixer. Electrical energy for operation of the system may be supplied from a convenient 115 volt A.C. power source through a pair of lead lines, or busses 90 and 92. Fuses 94 are provided in each of the busses 90 and 92 for protecting the circuits connected therewith and an on-off power switch, indicated by the numerals 96a and 96b, is used to control the supply of electrical energy to the system.

A red pilot light 98 is connected across the lines 90 and 92 to indicate that power is being supplied to the system by closure of the on-off switch contacts 96a and 96b. All of the switches, lights, meters, etc., of the electrical system are preferably mounted on a single control panel 100, shown schematically in FIG. 1 and preferably, the panel is located in the vicinity of the mixer 10 so that an operator may directly view the condition of the material discharged therefrom.

A control signal proportional to the amount of power supplied to the mixer motor 58 is delivered to the electrical control system through a pair of signal lines 102 and 104 connected to the motor power lines 60 and 64 (FIG. 1) and a motor current transformer 106 and coupling transformer 108 are connected with the signal lines to provide for a signal of proper voltage and current to drive a visual load indicator 110 which comprises a primary part of a meter relay system, indicated as a whole by the numeral 112. The load indicator 110 includes a pointer 114 movable across a visual scale 116 to provide the operator with an instantaneous indication of the amount of current drawn by the motor 58. In addition to the instantaneous current indicator needle 114, the load indicator includes a manually adjustable low-set pointer 118 and a similar high-set pointer 120, which are adjustable along the scale 116 by respective control knobs 118a and 120a.

In a system constructed in accordance with the present invention, the meter relay system 112 comprises a type 195 meter relay mechanism manufactured by the General Electric Company and described in their bulletin formerly identified as GEI–88935 and now numbered 198 4556K52—001, to which reference may be had for a more detailed description of the operation and construction of the unit. However, meter relay systems by other manufacturers having similar high-set and low-set characteristics could be used in the present invention. The meter relay system 112 includes a control module having a group of high-set relay contacts 122 and a group of low-set relay contacts 124. Instantaneous signal current is supplied to the control module through a multi-conductor cable 126 connected between the load indicator 110 and control module.

Electrical power is supplied to high-set and low-set relays of the control module through a wire 128 connected directly to power lead 92 and through a wire 128 connected to the power lead 90 through a pair of contacts 132a of a three position mode control switch indicated as a whole by the reference numeral 132. In addition, a pair of interlocking motor control relay contacts 134 are connected in series with the contacts 132a in the line 130, and these relay contacts 134 are closed whenever the motor 58 is energized through the lines 60, 62 and 64, power to which is controlled by a motor control and starter mechanism. When the motor is not energized, the relay contacts 134 are open and, accordingly, no power is supplied the control module through the line.

When the mode control switch 132 is placed in an "Auto" position, the contacts 132a are closed, as indicated, and the system operates in an automatic mode with power supplied to the control module for effecting automatic control of the discharge gate 22. In order to visually indicate to an operator that the system is in the automatic mode of operation, a pilot light 136 placarded "Auto" is provided and is connected between the power lead 92 and the right-hand contact of the switch contacts 132a through a wire 130a. When the mode control switch 132 is in the "Open" or "Close" position, the contacts 132a are opened and no power is supplied to the control module or pilot light 136 through the line 130, and control of the system is manual rather than automatic.

The high-set and low-set relays 122 and 124 contain a number of normally open and normally closed contacts available for use in controlling various electrical components connected therewith. In the present invention, one set of normally closed contacts 122a and 124a, respectively, is utilized and the high-set relay contacts 122a are connected in series between the wire 130, a pair of normally closed gate closing relay contacts 138a, a gate opening relay coil 140 and the power line 92. The low-set relay contacts 124a are connected in series between the line 130, a pair of normally closed gate opening relay contacts 140a, a gate closing relay coil 138, and the power line 92.

When power is supplied to the control module 112 through the line 130 when the mode selector switch 132 is in the "Auto" position and when the instantaneous load indicator needle 114 is below the high-set point, as selected, with the control knob 120a and corresponding high-set needle 120 of the load indicator, the high-set relay 122 is energized and the normally closed contacts 122a are opened so that no current will flow through the gate opening relay coil 140. However, when the load indicator needle 114 goes above the selected high-set point, the high-set relay 122 becomes de-energized and the contacts 122a return to the normally closed condition and the gate opening relay coil 140 is energized. The gate opening relay 140 controls the normally closed contacts 140a and a second pair of normally open contacts 140b, which are connected in series between the power lines 90 and 92 and the gate opening valve solenoid winding 78a. Energizing the relay coil 140 opens the contacts 140a and closes the contacts 140b permitting current flow through the solenoid winding 78a to move the discharge gate 22 to the fully open position, as previously described. Opening of the contacts 140a prevents the possibility of current flowing through the gate closing relay coil 138 and, hence, there is no possibility that air pressure would be supplied to both ends of the cylinder 28 at the same time. An amber pilot light 142 is connected in parallel with the solenoid winding 78a to indicate or signal to the operator that the gate opening solenoid is in operation.

Operation of the low-set relay 124 is similar to that of the high-set system just described. When the mode switch 132 is in "Auto" and the indicator pointer 114 is above the low-set level selected by the control knob 118a and indicator needle 118, the contacts 124a are opened 138. However, when the instantaneous load indicator needle 114 drops below the low level set point, low-set relay 124 is de-energized and the contacts 124a return to their normally closed position allowing current to flow through gate closing relay coil 138. Energization of the gate closing relay coil 138 causes the normally closed contact 138a controlled thereby to open and, additionally, causes a pair of normally open contacts 138b controlled thereby to close. The contacts 138b are connected in series between the power leads 90 and 92 and the gate closing solenoid valve winding 82a, and when the contacts 138b close, current flows through the winding 82a causing pressurized fluid to move the discharge gate 22 to the closed position, as previously described. A pilot light 143 is connected in parallel across the solenoid winding 82a to give a visual light signal to the operator that the solenoid 82a is operating to close the discharge gate 22.

In order to permit opening and closing of the discharge gate 22 without the use of the automatic control system, the contacts 138b are bypassed by a jumper 144 having the set of contacts 132c of the mode switch 132 connected serially therein. The contacts 140b are bypassed by a jumper 146 having the pairs of contacts 132b and 132d serially connected therein. Accordingly, if it is desired to maintain the discharge gate 22 in the open position for a period of time, as for example, when the mixer is being cleaned, the mode switch 132 is moved to the "Open" position. When this occurs, the contacts 132a are opened, taking the system out of the automatic mode, the contacts 132b are closed and the contacts 132d are maintained in the closed position. Accordingly, current flow flows from the power line 90 through the jumper 146 and closed contacts 132b and 132d, bypassing the open contacts 140b and energizing the door opening solenoid 78a and pilot light 142 to move the discharge gate to the open position and maintain this position until the mode selector switch 132 is changed to another position.

When it is desired to move the discharge gate 22 to the closed position, the mode selector switch 132 is moved to the "Close" position and in this position the contacts 132a remain open, the contacts 132b remain closed, the contacts 132c are closed, and the contacts 132d are opened. Accordingly, the open contacts 138b are bypassed by current flowing from the power line 90 through the jumper 144 and closed contacts 132c to energize the door closing solenoid 82a and pilot light 143, causing the discharge gate to move to a closed position until the mode selector switch is changed.

From the foregoing, it can be seen that the discharge gate 22 can be operated in an automatic mode, as previously described in detail, or can be moved to a closed or open position and maintained in the selected position by selecting the "Open" or "Closed" position with the mode selector switch 132. When the discharge system is operated in the automatic mode, movements of the discharge door 22 are effected automatically to control the mixer discharge rate in accordance with the instantaneous conditions in the mixer. The automatic system provides visual signals to the operator at the control panel 100 and regulates the flow of material through the mixer 10 to provide uniform conditioning of the material and reduce the amount of load fluctuations on the drive motor 58. The low-set and high-set levels can be manually adjusted as desired and accurate control of the mixing operation can be achieved, producing a finished product that is uniform in consistency even though the flow rate may change from time to time.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In combination, a mixer for conditioning bulk material and the like comprising a mixing chamber having a discharge opening, a mixing head in said chamber for mixing said material, motor means for driving said mixing head, a discharge door operatively associated with said opening for regulating the discharge of material from said chamber, said door being movable in one direction toward said discharge opening toward a closed position and in an opposite direction through an intermediate range toward an open position, fluid actuated operator means for moving said door in opposite directions, fluid conduit means for supplying fluid to opposite ends of said operator means, first and second valve means in said conduit means for directing the flow of fluid toward and away from respective opposite ends of said operator means for opening and closing said door, control means including means for measuring the power of said motor means interconnected with said first and second valve means whereby said first valve means is actuated for closing the door in response to a selected low power level and said second valve means is actuated for opening said door in response to a selected high power level, and throttle valve means in said conduit means for selectively adjusting the flow rate of fluid toward and away from the respective opposite ends of said operator means whereby the rate of opening and closing of said door is selectively controlled.

2. The combination of claim 1 wherein said fluid operator means comprises a double acting cylinder with a piston therein slidable toward opposite ends of said cylinder, and wherein said first and second valve means are normally positioned to vent opposite ends of said cylinder to the atmosphere when said door is positioned in said intermediate range.

3. The combination of claim 1 including adjustable means for biasing said door toward said closing position against the pressure of material in said mixing chamber when said door is positioned in said intermediate range.

4. A control system adapted for use with a mixer for conditioning granular material and the like of the type including a mixing chamber having a discharge opening, a mixing head in said chamber for mixing said material, motor means for driving said mixing head, a discharge door operatively associated with said opening for regulating the discharge of material from said chamber, said door being movable in one direction toward said discharge opening toward a closed position and in an opposite direction through an intermediate range toward an open position, said system comprising fluid actuated operator means for moving said door in opposite directions, fluid conduit means for supplying fluid to opposite ends of said operator means, first and second valve means in said conduit means for directing the flow of fluid toward and away from respective opposite ends of said operator means for opening and closing said door, control means including means for measuring the power of said motor means interconnected with said first and second valve means whereby said first valve means is actuated for closing the door in response to a selected low power level and said second valve means is actuated for opening said door in response to a selected high power level, and throttle valve means in said conduit means for selectively adjusting the flow rate of fluid toward and away from the respective opposite ends of said operator means whereby the rate of opening and closing of said door is selectively controlled.

5. The control system of claim 4 including operator means comprising a double acting cylinder with a piston therein slidable toward opposite ends of said cylinder, and wherein said first and second valve means are normally positioned to vent opposite ends of said cylinder to the atmosphere when said door is positioned in said intermediate range.

6. The control system of claim 4 including adjustable means for biasing said door toward said closing position against the pressure of material in said mixing chamber when said door is positioned in said intermediate range.

References Cited

UNITED STATES PATENTS 2,652,175  9/1953  Davis _____ 222—504 X

ROBERT B. REEVES, *Primary Examiner.*

HADD S. LANE, *Assistant Examiner.*